(12) United States Patent
Patchen et al.

(10) Patent No.: US 12,011,856 B2
(45) Date of Patent: Jun. 18, 2024

(54) MINERAL-FILLED POLYMER ARTICLES AND METHODS OF FORMING SAME

(71) Applicant: PACTIV LLC, Lake Forest, IL (US)

(72) Inventors: William Patchen, Farmington, NY (US); Ming Ho, Fairport, NY (US)

(73) Assignee: PACTIV LLC, Lake Forest, IL (US)

( * ) Notice: Subject to any disclaimer, the term of this patent is extended or adjusted under 35 U.S.C. 154(b) by 0 days.

(21) Appl. No.: 17/549,792

(22) Filed: Dec. 13, 2021

(65) Prior Publication Data

US 2022/0347908 A1 Nov. 3, 2022

Related U.S. Application Data

(63) Continuation of application No. 16/188,885, filed on Nov. 13, 2018, now Pat. No. 11,198,241.

(Continued)

(51) Int. Cl.
| | |
|---|---|
| *B29C 45/00* | (2006.01) |
| *B29C 45/73* | (2006.01) |
| *B29C 48/00* | (2019.01) |
| *B29C 51/00* | (2006.01) |
| *B29C 51/02* | (2006.01) |
| *B29C 51/42* | (2006.01) |

(Continued)

(52) U.S. Cl.
CPC .......... *B29C 45/0001* (2013.01); *B29C 45/73* (2013.01); *B29C 48/0017* (2019.02); *B29C 51/002* (2013.01); *B29C 51/02* (2013.01); *B29C 51/428* (2013.01); *C08K 3/34* (2013.01); *C08L 67/02* (2013.01); *B29C 2945/76618* (2013.01); *B29K 2067/00* (2013.01); *B29K 2067/003* (2013.01); *B29K 2105/16* (2013.01); *B29L 2031/7132* (2013.01); *C08L 23/0869* (2013.01)

(58) Field of Classification Search
CPC ............................................. B29C 2945/76618
See application file for complete search history.

(56) References Cited

U.S. PATENT DOCUMENTS

| | | |
|---|---|---|
| 4,589,569 A | 5/1986 | Clements |
| 4,615,459 A | 10/1986 | Clements |

(Continued)

OTHER PUBLICATIONS

U.S. Appl. No. 16/188,885 (U.S. Pat. No. 11,198,241), filed Nov. 13, 2018 (Dec. 14, 2021).

(Continued)

*Primary Examiner* — Atul P. Khare
(74) *Attorney, Agent, or Firm* — Baker Botts L.L.P.

(57) ABSTRACT

Mineral-filled polymer compositions and methods of forming such polymer compositions into a thermally stable article are provided. Methods of forming a polymeric article include providing a polymer composition comprising a crystallizable polymer, a mineral filler in an amount of more than about 15 wt-% based on the total weight of the polymer composition, and an impact modifier, wherein the polymer composition is at a temperature less than a crystallization temperature of the crystallizable polymer. The methods further include disposing the polymer composition in a mold, forming the polymer composition into an article within the mold, and releasing the article from the mold. The methods can include thermoforming the polymer composition in a mold, or injection molding the polymer composition in a molten form in a mold.

19 Claims, 8 Drawing Sheets

Related U.S. Application Data (60) Provisional application No. 62/747,968, filed on Oct. 19, 2018, provisional application No. 62/641,009, filed on Mar. 9, 2018, provisional application No. 62/585,388, filed on Nov. 13, 2017.

(51) Int. Cl.
*C08K 3/34* (2006.01)
*C08L 67/02* (2006.01)
*B29K 67/00* (2006.01)
*B29K 105/16* (2006.01)
*B29L 31/00* (2006.01)
*C08L 23/08* (2006.01)

(56) References Cited

U.S. PATENT DOCUMENTS

| | | | |
|---|---|---|---|
| D287,919 S | 1/1987 | Clements | |
| 4,753,365 A | 6/1988 | Seppala | |
| 4,981,631 A | 1/1991 | Cheung et al. | |
| 5,321,056 A * | 6/1994 | Carson | C08L 51/003 525/308 |
| 5,409,967 A * | 4/1995 | Carson | C08L 67/02 525/308 |
| 6,576,309 B2 | 6/2003 | Dalgewicz, III et al. | |
| D476,566 S | 7/2003 | Smith et al. | |
| D476,891 S | 7/2003 | Clarke et al. | |
| D477,223 S | 7/2003 | Smith et al. | |
| D478,006 S | 8/2003 | Smith et al. | |
| 6,644,490 B2 | 11/2003 | Clarke | |
| D485,758 S | 1/2004 | Clarke et al. | |
| 6,679,397 B2 | 1/2004 | Smith et al. | |
| 6,716,500 B2 | 4/2004 | Oda et al. | |
| D489,260 S | 5/2004 | Smith et al. | |
| 6,732,875 B2 | 5/2004 | Smith et al. | |
| 6,874,649 B2 | 4/2005 | Clarke et al. | |
| D514,444 S | 2/2006 | Smith et al. | |
| D514,445 S | 2/2006 | Smith et al. | |
| 7,063,224 B2 | 6/2006 | Clarke et al. | |
| D530,602 S | 10/2006 | Boller et al. | |
| 7,131,551 B2 | 11/2006 | Smith | |
| 7,134,566 B2 | 11/2006 | Smith et al. | |
| D533,778 S | 12/2006 | Hollis et al. | |
| D535,561 S | 1/2007 | Smith et al. | |
| 7,156,251 B2 | 1/2007 | Smith et al. | |
| 7,159,732 B2 | 1/2007 | Smith et al. | |
| D536,249 S | 2/2007 | Smith et al. | |
| D539,646 S | 4/2007 | Hollis et al. | |
| D539,649 S | 4/2007 | Smith et al. | |
| D539,650 S | 4/2007 | Smith et al. | |
| D540,165 S | 4/2007 | Hollis et al. | |
| D540,166 S | 4/2007 | Hollis et al. | |
| D540,167 S | 4/2007 | Smith et al. | |
| D540,672 S | 4/2007 | Hollis et al. | |
| D540,673 S | 4/2007 | Hollis et al. | |
| D540,674 S | 4/2007 | Hollis et al. | |
| D540,675 S | 4/2007 | Hollis et al. | |
| D541,153 S | 4/2007 | Hollis et al. | |
| D541,650 S | 5/2007 | Hollis et al. | |
| D541,651 S | 5/2007 | Hollis et al. | |
| D544,793 S | 6/2007 | Hollis et al. | |
| 7,246,715 B2 | 7/2007 | Smith et al. | |
| D556,573 S | 12/2007 | Hollis et al. | |
| 7,309,730 B2 * | 12/2007 | Kim | C08L 83/10 525/464 |
| 7,513,382 B2 | 4/2009 | Clarke et al. | |
| 7,670,545 B2 | 3/2010 | Bopp et al. | |
| 7,691,302 B2 | 4/2010 | Hollis et al. | |
| 7,731,047 B2 | 6/2010 | Ishimitsu | |
| 7,789,260 B2 | 9/2010 | Hollis et al. | |
| 7,819,271 B2 | 10/2010 | Hollis et al. | |
| D635,855 S | 4/2011 | Smith et al. | |
| 8,227,060 B2 | 7/2012 | Obuchi et al. | |
| 8,317,050 B2 | 11/2012 | Hollis et al. | |
| 8,962,791 B2 | 2/2015 | Benson | |
| 9,828,163 B2 | 11/2017 | Sasauchi et al. | |
| 2002/0135102 A1* | 9/2002 | Forbes | A47G 21/00 264/328.18 |
| 2009/0179035 A1 | 7/2009 | Agarwal et al. | |
| 2009/0186990 A1 | 7/2009 | Inui et al. | |
| 2012/0184672 A1 | 7/2012 | Riscanu et al. | |
| 2012/0267368 A1* | 10/2012 | Wu | B65D 43/00 220/200 |
| 2014/0031457 A1 | 1/2014 | Alidedeoglu et al. | |
| 2014/0091490 A1 | 4/2014 | Tedford et al. | |
| 2016/0185955 A1* | 6/2016 | Chen | C08L 67/04 524/425 |
| 2017/0335054 A1* | 11/2017 | Kulkarni | C08G 63/80 |

OTHER PUBLICATIONS

U.S. Appl. No. 16/188,885, filed Nov. 9, 2021 Issue Fee Payment.
U.S. Appl. No. 16/188,885, filed Aug. 9, 2021 Notice of Allowance.
U.S. Appl. No. 16/188,885, filed May 11, 2021 Response to Restriction Requirement.
U.S. Appl. No. 16/188,885, filed Jan. 11, 2021 Restriction Requirement.
International Search Report and Written Opinion dated Jan. 24, 2019 in International Application No. PCT/US18/60583.
SPI Plastics Engineering Handbook, Fifth Edition, edited by Michael L. Berins (1991) Chapter 5.
Thorne, Thermoforming Crystallizing Poly(ethylene Terephthalate) (CPET), Advances in Polymer Technology, vol. 8, No. 2, 131-146, (1988).

* cited by examiner

Before Use    After Use

FIG. 10

MINERAL-FILLED POLYMER ARTICLES AND METHODS OF FORMING SAME

PRIORITY CLAIM

This application is a continuation of U.S. patent application Ser. No. 16/188,885, filed Nov. 13, 2018, which claims priority to U.S. Provisional Application Ser. No. 62/585,388, filed Nov. 13, 2017, U.S. Provisional Application Ser. No. 62/641,009, filed Mar. 9, 2018, and U.S. Provisional Application Ser. No. 62/747,968, filed Oct. 19, 2018, the contents of each of which are incorporated herein by reference in their entirety.

BACKGROUND OF THE DISCLOSED SUBJECT MATTER

Field of the Disclosed Subject Matter

The disclosed subject matter generally relates to polymer compositions containing a crystallizable polymer and a mineral filler. Particularly, the polymer compositions can be formed, e.g., thermoformed or injection molded, into a polymeric article capable of withstanding extreme temperatures without deformation.

Description of the Related Art

A wide range of products are manufactured from polymer compositions into a finished article. Such products include packaging for food, beverages, and various consumer products. Such polymeric articles must be mechanically and thermally stable, both under the conditions of manufacturing and during use. For example, parts for containers for foods and beverages generally must withstand hot and cold temperatures. In the case of hot beverage cups and lids, the temperatures of their contents can range up to about 220° F. For example, coffees and teas are typically brewed at 190° F. to 205° F. and served at 155° F. to 180° F. These hot beverages can be served in a heavy paper or polystyrene cup and can be covered with a thermoformed lid. Lids for these applications must have the mechanical strength to withstand the force required to push the lid onto the cup, and also must maintain dimensional stability at the temperature of the beverage.

Similarly, various food containers also should be able to withstand high temperatures and rapid temperature changes. Foods can be heated or reheated, e.g., in microwaves and/or ovens, from room temperature, refrigerated, or frozen conditions. For example, in quick serve applications, foods can be rapidly heated in high temperature convection ovens or combination microwave convection ovens, e.g., at temperatures of about 525° F. Conventional plastic containers can deform or warp under these conditions and paper containers can char, degrade, or discolor. Thus, there is a need for new container materials and articles having improved stability under these temperature conditions.

Polymeric compositions can be formed into suitable articles using known techniques, such as thermoforming or the like. For example, poly(ethylene terephthalate) (PET) is often used to create thermally stable products intended for use in the freezer and the oven. Often, thermoforming processes use nucleated PET in order to induce crystallization of the material. Moreover, the processes typically require two separate molding stations to achieve the desired amount of crystallinity, article shape and definition, and resistance to distortion as the article cools. Thus, the forming process requires a substantial amount of crystallinity to be developed before contacting the mold in order to reduce the amount of time required for the molding step. However, inducing crystallinity prior to the mold requires nucleated polymer compositions and/or additional heating steps to begin the crystallization process, which can be costly and time consuming.

There thus remains a continued need for techniques that can efficiently form a dimensionally stable, crystalline article in a single thermoforming step, and without the use of nucleated polymers. Furthermore, there is a continued need for a method of forming dimensionally stable polymeric articles capable of withstanding extreme conditions without the need to induce crystallization. The presently disclosed subject matter satisfies these and other needs.

SUMMARY OF THE DISCLOSED SUBJECT MATTER

The purpose and advantages of the disclosed subject matter will be set forth in and are apparent from the description that follows, as well as will be learned by practice of the disclosed subject matter. Additional advantages of the disclosed subject matter will be realized and attained by the compositions and methods particularly pointed out in the written description and claims hereof, as well as from the appended drawings.

To achieve these and other advantages and in accordance with the purpose of the disclosed subject matter, as embodied and broadly described, the disclosed subject matter includes a method of forming a polymeric article comprising providing a polymer composition comprising a crystallizable polymer, a mineral filler in an amount of more than about 15 wt-% based on the total weight of the composition, and an impact modifier, wherein the polymer composition is at a temperature less than a crystallization temperature of the crystallizable polymer. The method further includes disposing the polymer composition in a mold, forming the polymer composition into the polymeric article within the mold, and releasing the polymeric article from the mold.

In accordance with one aspect of the disclosed subject matter, forming the polymer composition into the polymeric article can include thermoforming the polymeric article from the polymer composition, wherein the mold has a mold surface with at least a region of the mold surface heated to a temperature above the crystallization temperature of the crystallizable polymer. The mold surface can be heated to a temperature of between about 250° F. and about 400° F. Forming the polymer composition into the polymeric article in the mold can be performed over a time period of 5 seconds or less. The crystallizable polymer proximate the heated region of the mold surface can be crystallized to a degree of crystallinity of at least about 20%. The method can further comprise extruding the polymer composition into a sheet without crystallization prior to disposing the polymer composition in the mold.

In accordance with another aspect of the disclosed subject matter, forming the polymer composition into the polymeric article can include injection molding the polymeric article, wherein the method further can include heating the polymer composition of the disclosed subject matter to a molten state prior to disposing the polymer composition in the mold. The mold can have a mold surface with a temperature less than the crystallization temperature of the crystallizable polymer while forming the polymeric article. The polymeric article thus can be crystallized to a degree of crystallinity less than about 5%. For example, the polymeric article can be injection molded without crystallization to form a non-crystalline polymeric article. As embodied herein, the polymeric article can be a container comprising a container wall having a wall thickness, wherein the container can be thermally stable up to a temperature of at least 450° F. for a duration of at least three minutes when the container at least partially contains an aqueous liquid.

Suitable crystallizable polymers can include, but are not limited to, poly(ethylene terephthalate) (PET), poly(lactic acid) (PLA), a nylon, poly(butyl terephthalate) (PBT), a poly(hydroxyalkanoate) (PHA), poly(ethylene naphthalate) (PEN), polyvinyl chloride (PVC), a polycaprolactone, a copolymer thereof, and a blend thereof. For example, and not limitation, the crystallizable polymer can include poly(ethylene terephthalate) (PET). The crystallizable polymer can be non-nucleated. As embodied herein, the polymer composition can include from about 50 wt-% to about 85 wt-% of the crystallizable polymer, based on the total weight of the crystallizable polymer composition.

Suitable mineral fillers can include, but are not limited to, talc, calcium carbonate, mica, silica, wollastonite, clay, calcium sulfate, alumina trihydrate, kaolin, feldspar, aluminum hydroxide, and a combination thereof. For example, and not limitation, the mineral filler can include talc. As embodied herein, the crystallizable polymer composition can include from about 15 wt-% to about 40 wt-% of the mineral filler, based on the total weight of the crystallizable polymer composition.

Suitable impact modifiers can include, but are not limited to, a copolymer of ethylene and methyl acrylate, acrylonitrile butadiene styrene, acrylonitrile styrene acrylate, methacrylate-butadiene-styrene, ethylene propylene diene monomer, chlorinated polyethylene, a non-reactive modified polyolefin, cross-linked polyacrylate, and a combination thereof. For example, and not limitation, the impact modifier can include a copolymer of ethylene and methyl acrylate. As embodied herein, the crystallizable polymer composition can include from about 0.5 wt-% to about 15 wt-% of the impact modifier, based on the total weight of the crystallizable polymer composition. The crystallizable polymer composition can further include a pigment, colorant, or combination thereof.

As further disclosed herein, for illustration, the polymer composition can comprise from about 50 wt-% to about 85 wt-% of the crystallizable polymer, from about 15 wt-% to about 50 wt-% of the mineral filler, and from about 0.5 wt-% to about 15 wt-% of the impact modifier, based on the total weight of the polymer composition. For example, the polymer composition can comprise from about 60 wt-% to about 75 wt-% of the crystallizable polymer, from about 25 wt-% to about 30 wt-% of the mineral filler, and from about 3 wt-% to about 10 wt-% of the impact modifier, based on the total weight of the polymer composition. In accordance with another aspect of the disclosed subject matter, the polymer composition can comprise about 65 wt-% of the crystallizable polymer, about 30 wt-% of the mineral filler, about 3 wt-% of the impact modifier, and about 2 wt-% of the additive, based on the total weight of the polymer composition.

As embodied herein, the polymeric article can be made in accordance with the disclosed methods is thermally stable up to a temperature of at least about 450° F. The polymeric article can comprise any suitable shape, such as a lid, e.g., for a hot or cold beverage container, or a bowl, platter, or cup or other container, e.g., for holding consumable contents or the like. The polymeric article can be thermally stable at high temperatures, e.g., up to about 450° F. For example, and not limitation, the polymeric article can be thermally stable when the polymeric article is a container and at least partially contains an aqueous liquid and is heated in a conventional convection oven or combination microwave convection oven at a temperature of about 525° F. for a duration of at least up to about 30 seconds, or at least up to about 3 minutes, or even at least up to 6 minutes. Furthermore, if a conventional combination microwave convection oven is used, the convection airflow and/or microwave can be set at full power during some or all of this duration.

It is to be understood that both the foregoing general description and the following detailed description and drawings are examples and are provided for purpose of illustration and not intended to limit the scope of the disclosed subject matter in any manner.

The accompanying drawings, which are incorporated in and constitute part of this specification, are included to illustrate and provide a further understanding of the composition and methods of the disclosed subject matter. Together with the description, the drawings serve to explain the principles of the disclosed subject matter.

BRIEF DESCRIPTION OF THE DRAWINGS

The subject matter of the application will be more readily understood from the following detailed description when read in conjunction with the accompanying drawings, in which.

DETAILED DESCRIPTION

Reference will now be made in detail to embodiments of the disclosed subject matter, examples of which are illustrated in the accompanying drawings. The disclosed subject matter will be described in conjunction with the detailed description of the system. The present disclosure relates to filled polymer materials, which can be formed into crystalline articles, e.g., by thermoforming, or into non-crystalline or low-crystallinity articles, e.g., by injection molding. Although reference will be made herein to articles that are food and beverage containers and lids, other similar suitable uses are contemplated. Additionally, although various thermoforming and injection molding techniques will be referenced throughout this disclosure, the disclosed polymer compositions can be used with other molding and forming processes.

In accordance with the disclosed subject matter, a method of forming a polymeric article includes providing a polymer composition comprising a crystallizable polymer, a mineral filler in an amount of more than about 15 wt-% based on the total weight of the polymer composition, and an impact modifier, wherein the polymer composition is at a temperature less than a crystallization temperature of the crystallizable polymer. The method further includes disposing the polymer composition in a mold, forming the polymer composition into an article within the mold, and releasing the article from the mold.

As used herein, the term "about" or "approximately" means within an acceptable error range for the particular value as determined by a person of ordinary skill in the art, which will depend in part on how the value is measured or determined, i.e., the limitations of the measurement system; for example, "about" can mean within a range of up to 20%, up to 10%, up to 5%, and or up to 1% of a given value. Also, as used herein, the term "thermally stable" means a polymeric article resistant to visually perceptible or measurable deformation(s) in size or shape for a defined temperature and duration of time.

As embodied herein, the crystallizable polymer can include any polymer that can rearrange into an ordered crystalline structure. As will be understood in the art, when an article is formed in accordance with the disclosed subject matter, the polymer need not rearrange into a structure that is completely crystallized, but can instead include crystalline and non-crystalline regions, i.e., be semi-crystalline. As used herein, a "crystallizable" polymer is one that has not yet significantly crystallized, but is capable of doing so when heated above its crystallization temperature. As such, a crystallizable polymer or low-crystallinity polymer will generally have a degree of crystallinity of less than about 10%, or even less than about 5%. In contrast, a crystallized polymer is one that has been heated above its crystallization temperature, e.g., during thermoforming as disclosed herein, to allow rearrangement of its polymeric structure. Thus, and in accordance with the disclosed subject matter, the phrase "crystalline" when used herein with reference to a thermally stable crystalline polymer or article generally refers to a polymer that has a degree of crystallinity of at least about 20%, or an article containing such a polymer. Additionally, a person of skill in the art will appreciate that the degree of crystallinity is based on the polymer content, adjusting for any mineral filler or other additive within the polymeric matrix.

For the purpose of example and not limitation, and as embodied herein, suitable crystallizable polymers include poly(ethylene terephthalate) (PET); poly(lactic acid) (PLA); nylons, including Nylon 6,6, Nylon 6, Nylon 12, etc.; poly(butyl terephthalate) (PBT); poly(hydroxyalkanoates) (PHAs), including poly(3-hydroxyvalerate) (PHV), poly(3-hydroxybutyrate) (P3HB), and poly(4-hydroxybutyrate) (P4HB); poly(ethylene naphthalate) (PEN); polyvinyl chloride (PVC); polycaprolactones; and copolymers and blends thereof. For example, such suitable polymers can have a crystallization temperature that is above room temperature, such that crystallization of the polymer occurs during thermoforming or when the article is later heated in an oven after production. The presently disclosed articles can be formed from a single type of polymer, or can be formed from two or more polymers, which can be used as copolymers or within a polymer blend or laminated structure. In accordance with another aspect of the present disclosure, the crystallizable polymer is poly(ethylene terephthalate) (PET).

Additionally, as embodied herein, the crystallizable polymer can be non-nucleated. Such non-nucleated polymers can be sourced from post-consumer recycled material, which provides a further advantage over conventional materials that are primarily composed of virgin nucleated polymers.

As will be described in greater detail below, the use of a mineral filler with a crystallizable polymer can increase the crystallization rate of the polymer if desired. However, in some cases, the moisture content of the mineral filler can decrease the molecular weight, and correspondingly, the inherent viscosity, of the polymer. Thus, it can be desirable to employ techniques to maintain the inherent viscosity of the polymer. For example, chain extenders can be used to control the molecular weight of the polymer. Thus, the polymer can include a suitable chain extender, including but not limited to a dihydride or multifunctional epoxide.

As embodied herein, the mineral filler can include any suitable mineral for incorporation into polymeric materials. For example, the mineral filler can reinforce the material during thermoforming or injection molding, while providing dimensional stability and stiffness to a finished article. Moreover, the mineral filler can increase the crystallization rate of the polymer if desired, during thermoforming or when the article is later heated in an oven after production, and increase the thermal conductivity of the polymer. Mineral fillers suitable for use in the polymer compositions of the present disclosure include, but are not limited to talc, calcium carbonate, mica, silica, wollastonite, clay, calcium sulfate, alumina trihydrate, kaolin, feldspar, aluminum hydroxide, and combinations thereof. For example, in accordance with another aspect, the polymer composition includes talc.

Figure 1:
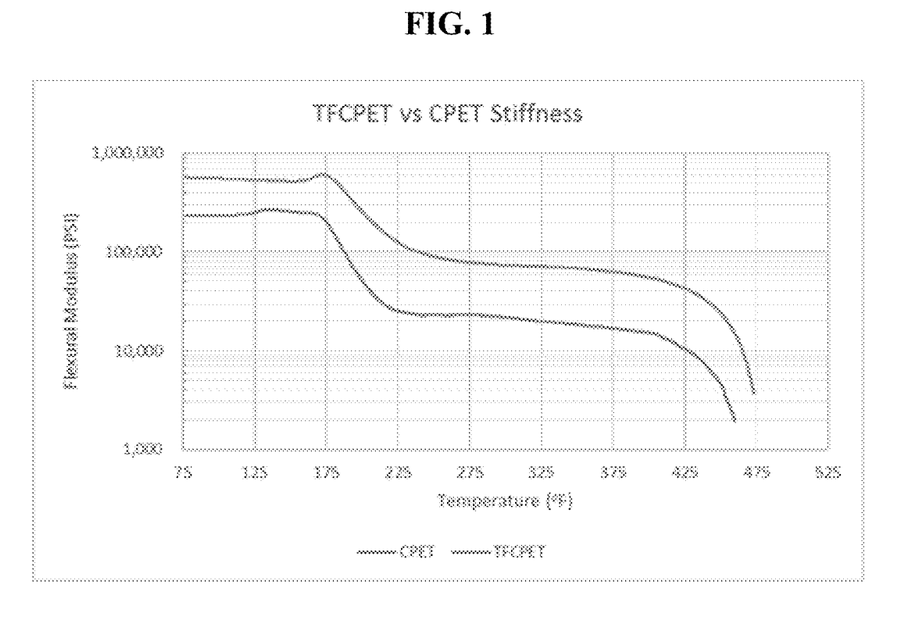
FIG. 1 is a graph comparing the stiffness of materials formed from neat PET and talc-filled PET, in accordance with the present disclosure.

As embodied herein, the polymer compositions of the present disclosure include a crystallizable polymer and a mineral filler. A large amount of mineral filler can be used, e.g., at least about 15 wt-% based on the entire polymer composition, while retaining strength, stability, and manufacturability in the article. For example, FIG. 1 presents a comparison, based on Dynamic Mechanical Analysis (DMA), of the modulus of a conventional crystallizable PET composition (CPET) with the modulus of a talc filled crystallizable PET composition (TFCPET) using samples from the bottom of containers formed from each composition. FIG. 1 shows stiffness as a function of temperature. PET crystallizes between 270° F. and 350° F., with a maximum rate between 290° F. and 320° F. In this region, the stiffness of the TFCPET is 3× that of the CPET. Hence, the talc filled composition has improved stiffness as compared to the unfilled composition at all temperatures and states of crystallization.

In this manner, and in another aspect of the disclosed subject matter, a crystalline article formed by, e.g., the thermoforming method, can have improved stiffness and be resistant to cracks and distortions. Additionally, in the crystalline article formed by thermoforming, the mineral filler can increase the crystallization rate of the polymer composition, enabling rapid thermoforming in a single step and without heating the polymer composition to a temperature above its crystallization temperature prior to thermoforming.

In accordance with another aspect of the disclosed subject matter, when a non-crystalline or low-crystallinity article is formed, e.g., by injection molding, the polymer composition having a mineral filler in an amount of more than about 15 wt-% of the total weight of the polymer composition surprisingly can be thermally stable to resist deformation, e.g., when heated in a convection oven up to about 525° F., as described further below. Furthermore, the non-crystalline or low-crystallinity article can crystallize after production, e.g., when heated in an oven by a user, providing additional thermal stability.

Additionally, the presently disclosed polymer compositions can include one or more impact modifiers. The use of a mineral filler can increase the brittleness of the polymer composition, and thus, an impact modifier can be used to impart toughness and durability to the finished article. As embodied herein, and as will be appreciated by a person of ordinary skill in the art, the impact modifier can include any polymer suitable for use as an impact modifier. Suitable impact modifiers include, but are not limited to, copolymers of ethylene and methyl acrylate, acrylonitrile butadiene styrene, acrylonitrile styrene acrylate, methacrylate-butadiene-styrene, ethylene propylene diene monomer, chlorinated polyethylene, non-reactive modified polyolefin, and cross-linked polyacrylate. In accordance with another aspect of the present disclosure, the impact modifier can be a copolymer of ethylene and methyl acrylate, such as Elvaloy® AC1224 (available from DuPont, Wilmington, DE).

As appropriate, the mineral can be incorporated with the impact modifier prior to addition to the crystallizable polymer. The amount of impact modifier can vary depending upon need. For example, if no annealing of the polymer composition is needed or performed, the amount of impact modifier can be reduced. In this manner, the amount of powder mineral filler added directly to the crystallizable polymer can be reduced or eliminated, which can help to maintain the moisture content, and correspondingly the molecular weight and inherent viscosity, of the polymer.

As embodied herein, the polymer composition includes at least about 15 wt-% of the mineral filler. For example, the polymer composition can include at least about 20 wt-%, at least about 25 wt-%, or at least about 30 wt-% of the mineral filler. For further example, and not limitation, the polymer composition can include from about 15 wt-% to about 50 wt-%, or from about 15 wt-% to about 40 wt-%, or from about 20 wt-% to about 35 wt-%, or from about 25 wt-% to about 30 wt-% of the mineral filler. Additionally, the polymer composition can include from about 50 wt-% to about 85 wt-%, or from about 55 wt-% to about 80 wt-%, or from about 60 wt-% to about 75 wt-% of the crystallizable polymer. Furthermore, the polymer composition can include less than about 15 wt-% of the impact modifier, e.g., from about 0.5 wt-% to about 15 wt-%, or from about 1 wt-% to about 12 wt-%, or from about 3 wt-% to about 10 wt-% of the impact modifier. As embodied herein, amounts expressed as a weight percent or "wt-%" can be based on the overall weight of the polymer composition.

In accordance with another aspect of the present disclosure, the polymer composition can consist essentially of one or more crystallizable polymer, mineral filler, and impact modifier. However, as embodied herein, the polymer composition can further comprise any suitable additives, as known by a person of ordinary skill in the art. For example, and not limitation, such additives include colorants, pigments, lubricants, plasticizers, stabilizers, fire retardants, fibers, processing aids, or other additives, e.g., additives to assist in the processing and manufacture of the polymer composition and finished article. For further example, the additive can be any compound that can be dispersed within the polymer composition without significantly changing the molecular structure of the polymeric matrix.

For example, and as embodied herein, the polymer composition can include a colorant or pigment. The colorant or pigment can be selected to provide an aesthetically pleasing appearance to an article formed from the polymer composition, e.g., by masking the color of the polymer. For example, the colorant can be a black colorant. Any suitable amount of colorant or pigment can be used, if provided. For illustration and not limitation, the colorant or pigment can be present in an amount of up to about 5 wt-%, such as, from about 0.01 wt-% to about 5 wt-%, or more particularly from about 0.1 wt-% to about 1.5 wt-%, based on the overall weight of the polymer composition.

Figure 2A:
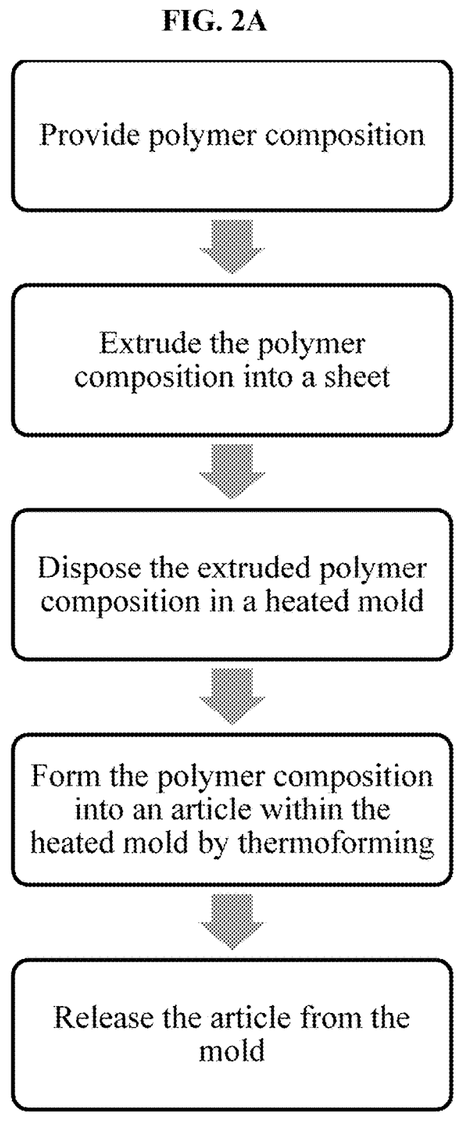
FIG. 2A is a flow chart showing a method of forming an article by thermoforming in accordance with one aspect of the present disclosure.

In accordance with the disclosed subject matter, methods are provided for forming a crystalline article from a polymer composition as disclosed herein. As outlined in FIG. 2A, such methods include thermoforming the disclosed polymer composition. Prior to thermoforming, the methods can include extruding a sheet from the polymer composition, such as in molten form through an extruder. The use of a mineral filler, as described herein, can reinforce the polymer composition during such an extrusion. As embodied herein, during extrusion, the crystallizable polymer can be maintained in an amorphous state, e.g., with a degree of crystallinity of less than about 10%. Additionally or alternatively, the polymer composition can be heated to a temperature that is less than the crystallization temperature of the polymer. As such, even if the polymer composition is heated, the crystallizable polymer can remain amorphous until a later thermoforming step. In contrast, conventional thermoforming processes typically initiate crystallization prior to molding the article, generally using a nucleated polymer and/or a pre-heating step to heat the polymer above its crystallization temperature prior to crystallization in a mold. For example, such conventional processes are described in U.S. Pat. No. 6,576,309, the contents of which are hereby incorporated by reference in its entirety.

The methods further include forming the polymer composition, e.g., in the form of an extruded sheet, within a mold. As embodied herein, the polymer composition can be molded in a single step, e.g., a single thermoforming step. For example, and not limitation, the polymer composition can be molded over a period of time of no more than about 10 seconds, no more than about 5 seconds, no more than about 3 seconds, no more than about 2 seconds, or no more than about 1 second. The polymer composition can be thermoformed directly from its amorphous phase to allow stretching to the desired geometry of the finished article. The mineral filler can increase the crystallization rate and thermal conductivity of the polymer, which can allow the polymer composition to quickly crystallize. Additionally, since the article can have any suitable wall thickness as known for thermoformed techniques, e.g., between about 0.005 inches and about 0.020 inches, the mineral filler can increase the stiffness of the thermoformed article, which reduces sticking and improves release from the mold. The added stiffness can also minimize the amount of warpage that occurs during cooling and reheating of the article, for example during manufacturing and/or use of the article.

In accordance with another aspect, a surface of the mold can be heated to a high temperature, e.g., at or above the crystallization temperature of the crystallizable polymer, to further increase the crystallization rate of the polymer and induce crystallinity in a polymer composition that is proximate the mold surface and within the mold. For example, and not limitation, the entire surface of the mold can be heated. Alternatively, one or more regions of the mold surface can be unheated or heated to a lower temperature, such as a temperature that is lower than the crystallization temperature of the polymer, in order to form a finished article with regions having both high crystallinity (e.g., at least about 20%) and low crystallinity (e.g., less than about 20%).

For example, and not limitation, the mold can be heated to a temperature of from about 200° F. to about 450° F., or from about 250° F. to about 400° F., or from about 300° F. to about 350° F., depending on the crystallizable polymer used in the polymer composition and degree of crystallinity desired. A person of skill in the art will appreciate that the temperature of the mold can be selected based on the particular crystallizable polymer of the polymer composition and will be at least the minimum temperature required to accelerate crystallization of the polymer, i.e., the crystallization temperature of the polymer. However, as known in the art and illustrated in Example 1, the crystallization rate of a polymer generally increases with temperature, as the temperature is increased above the minimum crystallization temperature to a preferred crystallization temperature corresponding to the greatest crystallization rate. However, at temperatures above the preferred crystallization temperature, the crystallization rate of the polymer will generally decrease. Thus, the temperature of the mold can be between the minimum crystallization temperature and the preferred crystallization temperature, and preferably, approximately equal to the preferred crystallization temperature. For example, if the polymer is poly(ethylene terephthalate) (PET), the crystallization temperature can be from about 300° F. to about 350° F., such as about 330° F.

Furthermore, the use of a heated mold can improve the thermal stability of the finished article, reducing the amount of warpage during subsequent heating or cooling of the article, even if the article is subsequently heated above its glass transition temperature. Thus, unlike conventional processes, a stable, crystalline article can be produced using the methods disclosed herein by a single thermoforming step, and the finished article can retain its shape upon further temperature changes. Indeed, the crystalline articles can be thermally stable up to temperatures of at least about 450° F., but can withstand higher environmental temperatures, e.g., of about 525° F. or greater. Thus, the crystalline articles produced by the presently disclosed methods can withstand exposure to high temperatures, for example, as would be encountered during cooking, heating, transport, and storage of hot foods and beverages.

As disclosed herein, the crystalline articles can be suitable for heating in a microwave oven, convection oven, or combination microwave convection oven (such as a TUR-BOCHEF® Sota Model NGO combination microwave convection oven). For example, in accordance with the present disclosure, the crystalline article, when at least partially containing an aqueous liquid, can be heated in a combination microwave convection oven at a high temperature (e.g., of greater than about 475° F., greater than about 500° F., or at least about 525° F.), for a duration of at least up to about 5 minutes, without visually perceptible or measurable deformation(s) in the size or shape of the article. Furthermore, if a combination microwave convection oven is used, the microwave can be set to full power and/or to full convection airflow during this duration with the article remaining thermally stable. For example, the duration can be up to about 5 minutes, up to about 4 minutes, up to about 3 minutes, up to about 2.5 minutes, up to about 2 minutes, up to about 1.5 minutes, up to about 1 minute, or up to about 30 seconds. For further example, the duration can range from about 30 seconds to about 5 minutes, or from about 30 seconds to about 4 minutes, or from about 30 seconds to about 3 minutes, or from about 30 seconds to about 2.5 minutes.

Figure 2B:
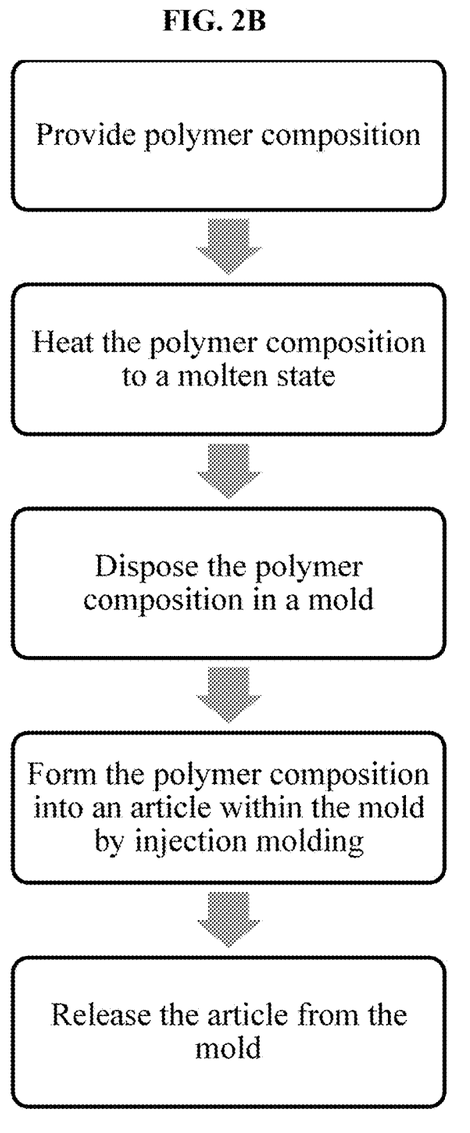
FIG. 2B is a flow chart showing a method of forming an article by injection molding in accordance with another aspect of the present disclosure.

In accordance with another aspect of the disclosed subject matter, the present disclosure provides methods of forming a non-crystalline or low-crystallinity article from a polymer composition as described herein. For example, and as outlined in FIG. 2B, the present disclosure provides methods of injection molding such a polymer composition. Injection molding can be performed by conventional systems and processes, e.g., such as those described in U.S. Patent Application Publication No. 2002/0135102 A1, and chapter five of the *SPI Plastics Engineering Handbook*, Fifth Edition, edited by Michael L. Berins (1991), the contents of each of which are hereby incorporated by reference in its entirety. For example, Husky Injection Mold System G160 RS42/35 is a suitable injection molding system for use with the disclosed subject matter. Once formed, the article can be released from the mold.

Prior to injection molding, the polymer composition can be heated to a molten state prior to disposing the polymer composition in the mold. The use of a mineral filler, as described herein, reinforces the polymer composition during and after injection molding. Indeed, and as set forth further below, the mineral-filled polymer composition of the disclosed subject matter with more than about 15 wt-% mineral filler remains thermally stable even without crystallization. For example, and as embodied herein, the mold can have a mold surface with a temperature less than the crystallization temperature of the crystallizable polymer while forming the article. In this manner, the crystallizable polymer can be maintained in an amorphous state during injection molding, and if desired when released from the mold. For example, during injection molding or in a subsequent step, the polymer composition can be heated to or maintained at a temperature less than the crystallization temperature of the polymer so as to remain generally amorphous. Accordingly, the article formed by injection molding can be crystallized to a degree of crystallinity less than about 5%, or the article can be injection molded without crystallization to form a non-crystalline article.

As embodied herein, the low-crystallinity or non-crystalline article of the disclosed subject matter can be a container suitable for use in a microwave oven, convection oven, or combination microwave convection oven (such as a TURBOCHEF® Sota Model NGO combination microwave convection oven). For example and in accordance with the disclosed subject matter, the container, when at least partially containing an aqueous liquid, can be heated in a combination microwave convection oven at a high temperature (e.g., of greater than about 475° F., greater than about 500° F., or at least about 525° F.), for a duration of at least up to about 3 minutes, or even about 6 minutes, without any visually perceptible deformation in the size or shape of the container. Furthermore, the container, when at least partially containing an aqueous liquid, can be heated in a combination microwave convection oven at a high temperature (e.g., of greater than about 475° F., greater than about 500° F., or at least about 525° F.), with the microwave set to full power and at full convection airflow, for a duration of at least up to about 1 minutes, or even about 3 minutes, without any visually perceptible deformation in the size or shape of the container.

In accordance with the disclosed subject matter, the injection molded article can be a container comprising any suitable shape, such as but not limited to a lid, bowl, platter, or cup, having a container wall with a wall thickness. For example, the container wall can have a wall thickness of between about 0.025 inches and about 0.035 inches, such as about 0.028 inches. Surprisingly, and in accordance with the disclosed subject matter, the container formed by the injection molding method can be thermally stable when heated to extreme temperatures in a convection oven, even without crystallization of the polymer prior to use. For example, when an injection molded container of the disclosed subject matter with a wall thickness of between about 0.025 inches and about 0.035 inches at least partially contains an aqueous liquid, the container can remain thermally stable and resist deformation up to a temperature of at least about 450° F., or even up to a temperature of about 525° F., for a duration of at least 3 minutes, or even up to 6 minutes.

That is, the injection molded articles of the disclosed subject matter exhibit surprising and advantageous characteristics. Particularly, and for purpose of comparison, an injection molded container formed of a polymer composition having only about 15 wt-% mineral filler exhibited visibly perceptible deformation when exposed to a temperature of about 525° F. in a TURBOCHEF® Sota Model NGO combination microwave convection oven for a duration of 3 minutes at full microwave power and full convection airflow. By contrast, an injection molded container of the disclosed subject matter formed of a polymer composition having greater than 15 wt-% mineral filler remained thermally stable at the same conditions. Indeed, and surprisingly, such an injection molded container as disclosed herein required no crystallization prior to use, and remained thermally stable even at more extreme conditions as set forth in the below examples.

Accordingly, the non-crystalline or low-crystallinity article formed by the disclosed subject matter can provide several advantages. For example, and as previously noted, conventional thermoforming processes typically require an annealing step, or crystallizing a polymer composition prior to molding by employing a nucleated polymer and/or a pre-heating step to heat the polymer above its crystallization temperature prior to crystallization in a mold. The non-crystalline or low-crystallinity article formed by the disclosed subject matter does not require such an annealing or crystallization step during production of the article, which can improve production efficiency and minimize the amount of impact modifier needed for the polymer composition as the article can remain amorphous during production and post-production, e.g., until the article is later heated in an oven. However, it is recognized that the injection molded article can be heated to the crystallization temperature if desired, to further increase the degree of crystallinity.

In accordance with the embodiments of the subject matter previously described, the crystalline article thermoformed from the disclosed polymer compositions can be any article formed by such a thermoforming method. For example, and not limitation, such articles include food and beverage containers, consumer products, medical devices, electronics, and packaging materials therefor.

In another aspect, the presently disclosed methods can be used in the manufacture of lids for hot and/or cold beverage containers. The height, weight, shape, and design of the lid can be selected as desired to fit a suitable beverage container, such as a coffee cup, as is well known in the art. Exemplary lid designs include, but are not limited to, those described and shown in U.S. Pat. Nos. 8,317,050, 7,819,271, 7,789,260, 7,691,302, D556,573, D544,793, D541,651 D541,650, D541,153, D540,675, D540,674, D540,673, D540,672, D540,166, D540,165, D539,646, D533,778, D635,855, 7,731,047, 7,513,382, 7,246,715, D540,167, D539,650, D539,649, D536,249, D535,561, 7,159,732, 7,156,251, 7,134,566, 7,131,551, D530,602, 7,063,224, D514,445, D514,444, 6,874,649, 6,732,875, D489,260, D485,758, 6,679,397, 6,644,490, D478,006, D477,223, D476,891, D476,566, 4,753,365, D287,919, 4,615,459, and 4,589,569, the contents of each of which are incorporated herein by reference in their entireties.

Additionally, the presently disclosed methods can be used in the manufacture of food containers such as bowls, cups, plates, trays, platters, and the like. The articles can withstand rapid thermal changes to high temperatures, e.g., as encountered in a microwave oven convection oven, or combination microwave convection oven (such as a TURBOCHEF® Sota Model NGO combination microwave convection oven). Such articles can contain frozen, refrigerated, or room temperature foodstuffs or the like to be cooked or reheated. The foodstuffs can be in substantially solid or liquid form. In particular aspects, the crystalline articles, e.g., those containing liquid contents, can be heated to or above the melting temperature and distortion temperature of the crystallized polymer used to form the articles without the article warping, cracking, or otherwise distorting.

EXAMPLES

The presently disclosed subject matter will be better understood by reference to the following Examples. These Examples are merely illustrative of the presently disclosed subject matter and should not be considered as limiting the scope of the subject matter in any way.

Example 1: Mechanical Strength and Crystallinity of Talc Filled PET

This Example demonstrates the effect of a mineral filler on the mechanical strength and crystallinity of a PET article.

Five amorphous PET polymer compositions were prepared with talc loadings ranging from 0 wt-% ("neat PET") to 40 wt-%. The neat PET was non-nucleated. The heat deflection temperature of each polymer composition was determined according to ASTM D648-06, Standard Test method for Deflection Temperature of Plastics Under Flexural Load in the Edgewise Position (2006). The heat distortion temperature ("HDT") of each polymer composition is provided in Table 1.

TABLE 1

| HDT of Filled, Amorphous PET | |
| --- | --- |
| Talc Loading | HDT (° F.) |
| 0 wt-% | 156.6 |
| 10 wt-% | 167.9 |
| 20 wt-% | 171.0 |
| 30 wt-% | 244.0 |
| 40 wt-% | 249.6 |

As shown in Table 1, adding mineral fillers to polymers can increase the heat distortion temperature of the composition, and generally, higher loading of the mineral filler results in a higher heat distortion temperature.

Although the heat distortion temperature is increased, the reinforcement provided by the mineral filler does not result in stability when an article is thermoformed from the polymer composition using a conventional process, allowed to cool, and then reheated above its glass transition temperature. In contrast, a degree of crystallinity of at least 20% is generally required for thermal stability, and such a degree of crystallinity is not achievable using a conventional thermoforming process, particularly, a single step thermoforming process.

However, it was observed that the crystallization rate of the mineral-filled materials appeared to be higher than that of the neat PET. For example, at temperatures above 240° F., the 30 wt-% talc polymer composition became stiff and was difficult to form. Thus, the crystallization rates of several materials were tested using a controlled time and temperature seal bar. Three samples were exposed to the seal bar under low pressure at various times and temperatures, followed by rapid quenching in cold water. A first sample was composed of nucleated PET that did not include a mineral filler ("CPET"). A second sample was composed of 30 wt-% talc dispersed in PET ("TFPET30") and a third sample was composed of 5 wt-% talc dispersed in PET ("TFPET5").

Figure 3:
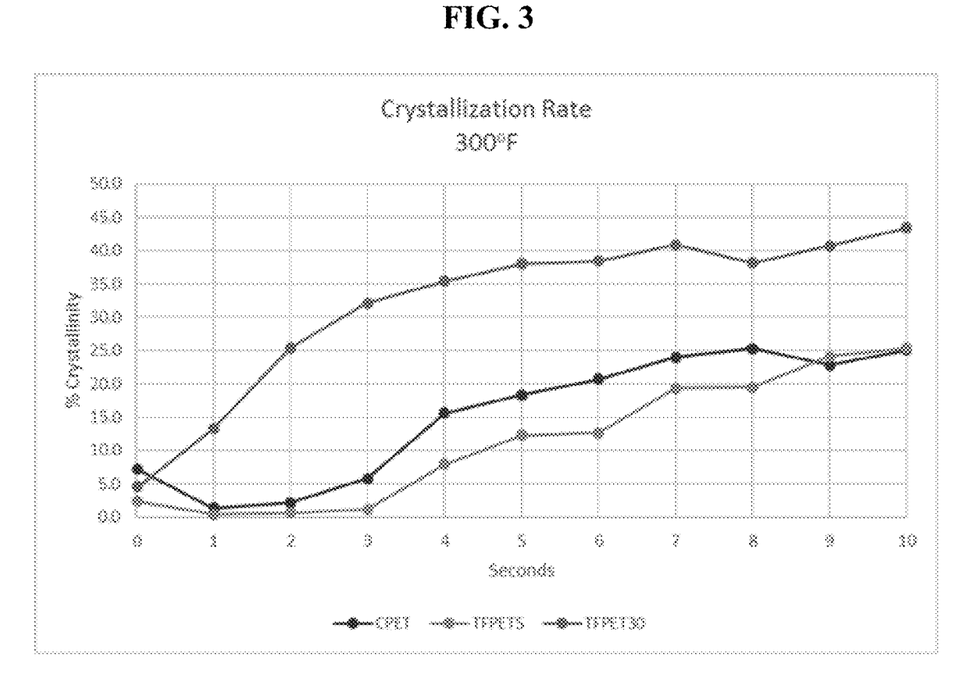
FIG. 3 is a graph comparing the crystallization rates of neat PET and talc-filled PET at temperatures of 300° F., in accordance with Example 1 of the disclosed subject matter.

Differential scanning calorimetry (DSC) was used to measure the crystallization content of each sample at the various times and temperatures. In this example, the degree of crystallinity, which is expressed as a percentage, refers only to the polymer phase of the composition. The weights of the polymer samples were corrected for filler loading while calculating the degree of crystallinity. A strong correlation was found between filler loading and crystallization rate. For example, FIG. 3 compares the crystallization rates of the three samples. The crystallization rate of the 30 wt-% talc sample was found to be much faster than that of nucleated PET without a filler. Similarly, the crystallization rate of the 5 wt-% talc sample was found to be just slightly less than that of the nucleated PET without a filler, and would be expected to be much higher than non-nucleated PET.

Figure 4:
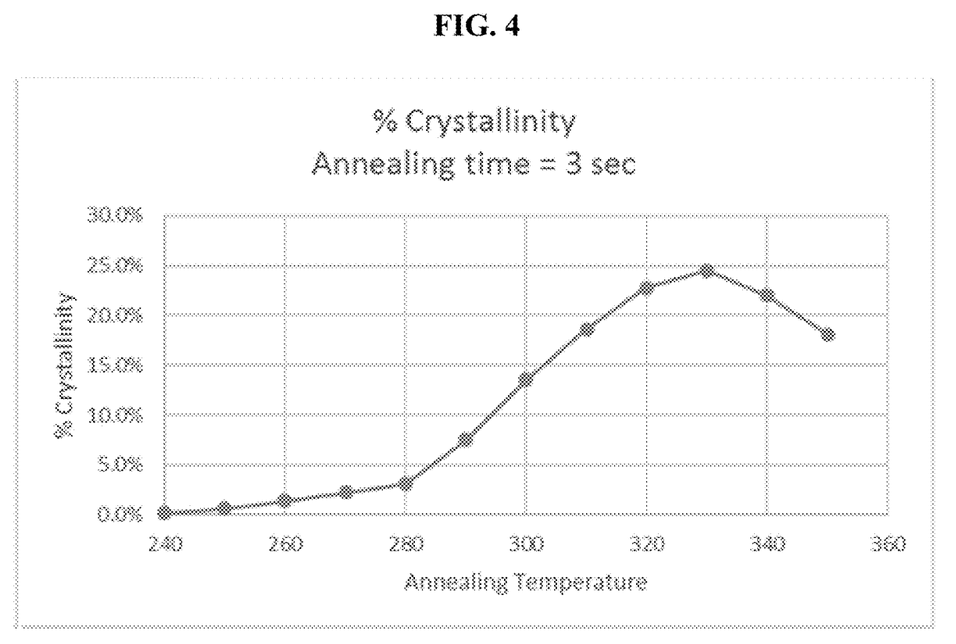
FIG. 4 is a graph of the degree of crystallinity of a PET polymer composition containing 20 wt-% talc when annealed at various temperatures, in accordance with Example 1 of the disclosed subject matter.

Additionally, the crystallization rate was also dependent on temperature. FIG. 4 shows the degree of crystallization achieved at various temperatures ranging from 240° F. to 350° F. using a three second annealing time. Although crystallization began to accelerate at temperatures above 280° F., the highest crystallization rate was observed at a temperature of 330° F., indicating that the preferred crystallization temperature of PET is about 330° F. At temperatures above 330° F., the crystallization rate decreased.

Example 2: Thermoformed Lid for Hot Beverage Container

This Example demonstrates the effect of the mold close time and temperature on the crystallinity of a finished article, and provides a thermally stable thermoformed lid in accordance with the presently disclosed subject matter.

A thermoformable sheet containing 30 wt-% talc, 5 wt-% Elvaloy® AC1224 (a copolymer of ethylene and methyl acrylate), and 65 wt-% PET (DAK C60A) was produced on a twin screw extruder with a coat hanger die. A first sheet was vacuum formed on a room temperature male mold. A Comet single-shot thermoforming machine with a mold modified to include an electric heater was used to thermoform articles from a second sheet having the same composition. For the second sheet, the mold was heated to 300° F.

Figure 5:
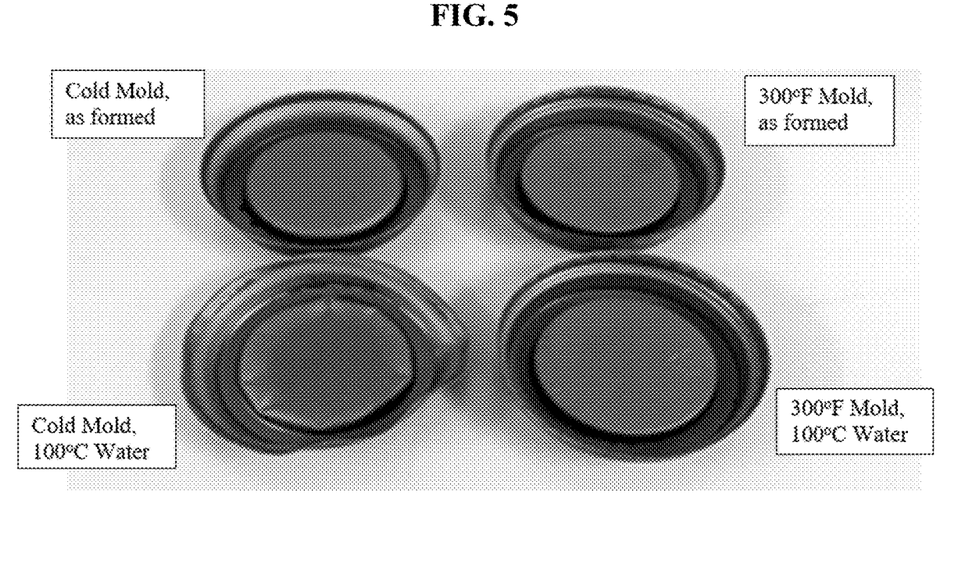
FIG. 5 is a photograph of thermoformed lids made from a PET polymer composition containing 30 wt-% talc to demonstrate the dimensional stabilities of lids formed in a room temperature mold as compared to a heated mold, when later exposed to hot water.

It was observed that the molding quality of an article formed in a heated mold was improved as compared to one formed in a cool (room temperature) mold. For illustration, FIG. 5 provides images comparing a lid formed with a room temperature mold and a 300° F. mold. Both molds created similar looking parts (top panels), each with a wall thickness of about 0.010 inches to 0.012 inches. However, when the cool-formed lid was used with a hot cup containing water heated to 100° C. (above its glass transition temperature), the lid released from the cup and distorted. For example, the bottom left panel of FIG. 5 shows a cool-formed lid after exposure to 100° C. water for 5 minutes. In contrast, the lid formed in the heated mold was thermally stable when heated to the same temperature (bottom right panel). The lid formed in the heated mold did not distort as it cooled and did not distort or release when used with a cup containing water heated to 100° C. Accordingly, the crystallization achieved using a heated mold was greater than achieved with a cool mold.

Figure 6:
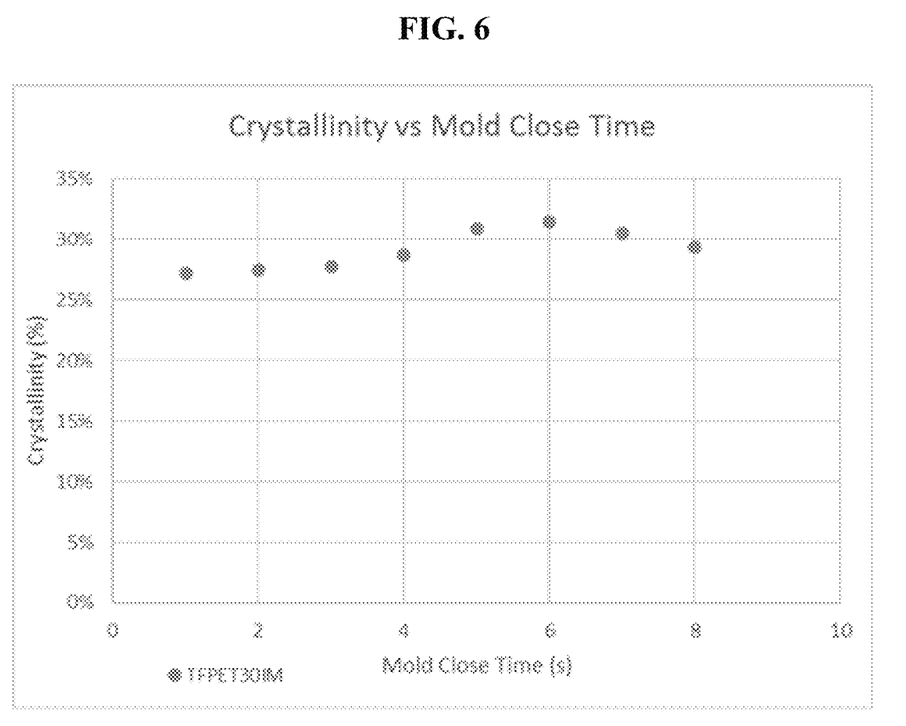
FIG. 6 is a graph of the degree of crystallinity of a PET polymer composition containing 30 wt-% talc when thermoformed with mold close times from 1 second to 8 seconds in a heated mold, in accordance with Example 2 of the disclosed subject matter.

Additionally, a thermally stable article can be formed with a high crystallization rate. FIG. 6 shows the degree of crystallinity achieved at various mold close times using the same polymer composition and a mold heated to 300° F., and demonstrates that high crystallinity (more than 25%) was achieved with mold close times as short as 1 second. Additionally, the material did not stick to the mold and was dimensionally stable.

As demonstrated by this Example, a talc-filled polymer composition can be introduced into a heated mold at a temperature below the crystallization temperature and can be crystallized and released without sticking to the mold. The mineral filler provides an increased crystallization rate and dimensional stability to release the material from the mold and remain stable as the formed article cools.

Thus, such an article can be formed at a fast thermoforming rate while achieving a satisfactory degree of crystallinity. For example, Table 2, below, shows the degree of crystallinity of the polymer composition when measured after the composition was extruded as a sheet, after heating the composition to 240° F., and after thermoforming an article from the composition within a mold heated to 300° F. with a mold close time of 3 seconds. As shown in Table 2, the polymer composition remained amorphous until the thermoforming step, but was crystallized in the thermoformed article to a high degree of crystallinity with a 3 second mold close time.

TABLE 2

| | Degree of Crystallinity |
| --- | --- |
| Sheet after extrusion | 1.4% |
| Sheet after heating to 240° F. | 1.7% |
| Thermoformed article | 27.8% |

Example 3: Talc Filled PET Material for Withstanding High Temperatures

This Example demonstrates the thermal stability of a crystalline article formed in accordance with the presently disclosed subject matter.

In this Example, a container was thermoformed from a sheet including 25 wt-% talc, 6.5 wt-% Elvaloy AC1224 (a copolymer of ethylene and methyl acrylate), 2 wt-% black colorant, and 66.5 wt-% PET (DAK C60A). Following crystallization, the container was found to be thermally stable up to 450° F.

Dynamic Mechanical Analysis (DMA) was used to compare the modulus of a conventional crystallized PET material (CPET) with the talc filled crystallized PET material (TFCPET), using samples from the bottom of containers formed from each material. As shown in FIG. 1, the talc filled material has improved stiffness as compared to the unfilled material.

Example 4: Thermoformed Bowl

This Example provides a thermally stable thermoformed bowl in accordance with the presently disclosed subject matter.

A 24-ounce bowl was formed from a thermoformable sheet containing 30 wt-% talc, 5 wt-% Elvaloy® AC1224 (a copolymer of ethylene and methyl acrylate), 1 wt-% black colorant, and 64 wt-% PET (DAK C60A), which was produced on a twin screw extruder with a coat hanger die. This thermoformable sheet was then vacuum formed on a 300° F. female mold, to form the 24 ounce bowl with a wall thickness of between about 0.012 inches to about 0.015 inches.

Figure 7:
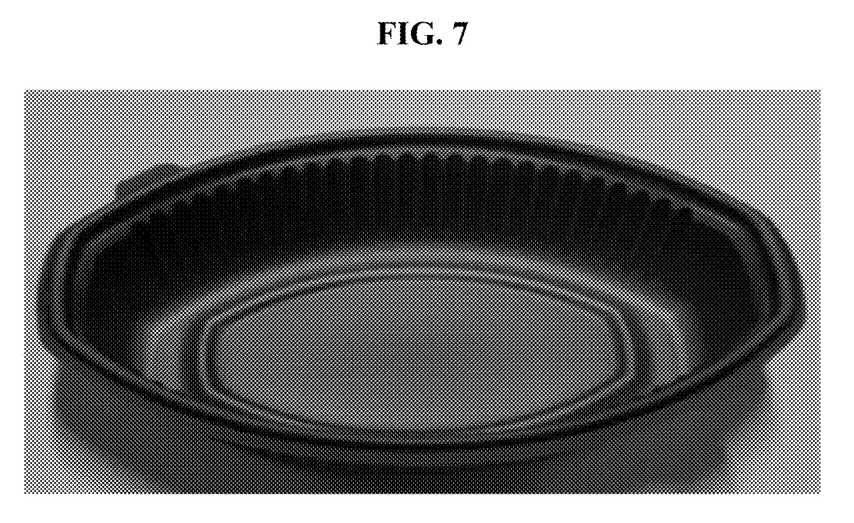
FIG. 7 is a photograph of a thermoformed bowl made from a PET polymer composition containing 30 wt-% talc, in accordance with Example 4 of the present disclosure.

When containing water, it was found that the bowl could be heated to 525° F. in a TURBOCHEF® Sota Model NGO combination microwave convection oven without showing any signs of distortion, even though the melting temperature of the container material was below the 525° F. oven temperature. For this example, the bowl was filled to contain about 12 ounces of cold tap water and was placed uncovered on a tray in a TURBOCHEF® Sota Model NGO combination microwave convection oven preheated to 525° F. Additionally, the oven was set at full microwave power and low convection airflow for 2.5 minutes. There was no visible distortion of the bowl at the end of this duration. A similar water-filled bowl was placed in the oven with 40% microwave power for 5 minutes and, again, the bowl still did not show any visible distortion. Measurements with an infrared pyrometer indicated that the temperature of the rim and upper portion of the sidewall of the container above the water line remained below the melting temperature and increased distortion temperature of the talc filled PET material of the presently disclosed subject matter. It appears that vapor from the water provided a cooling effect to the rim and upper portion of the sidewall and thereby maintained the entire container below the melting temperature and increased distortion temperature. A photograph of the bowl after testing is provided as FIG. 7.

By contrast, a second bowl formed from crystallized PET with no mineral filler (i.e., "neat" PET) softened and deformed under the same conditions (e.g., contained 12 ounces of water; placed in a TURBOCHEF® Sota Model NGO combination microwave convection oven preheated to 525° F. and set at full microwave power and low convection airflow for 2.5 minutes or at 40% microwave power for 5 minutes). In particular, the rim of the container distorted and the container became soft and difficult to handle when subjected to a similar temperature and duration in a TURBOCHEF® combination microwave convention oven whereas the talc filled crystallized PET container maintained stiffness to remain functional after heating.

For further comparison, a paper cup with an appropriate lid was subjected to the same conditions. Testing showed that the paper below the water line remained unaffected by the heat, but the paper above the water line, which was exposed only to water vapor, discolored.

Example 5: Thermoformed Cup

This Example provides a thermally stable thermoformed cup in accordance with the presently disclosed subject matter.

A yogurt cup with a flared top was formed from a thermoformable sheet containing 25 wt-% talc, 6.5 wt-% Elvaloy® AC1224 (a copolymer of ethylene and methyl acrylate), 1 wt-% black colorant, and 69.5 wt-% PET. The cup had a wall thickness of between about 0.006 inches to about 0.010 inches and was formed on a 300° F. mold.

Figure 8:
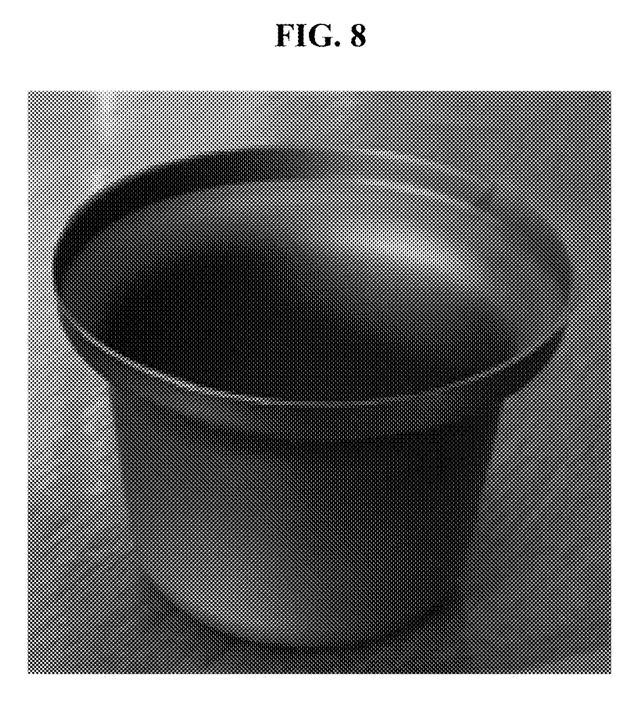
FIG. 8 is a photograph of a thermoformed cup made from a PET polymer composition containing 25 wt-% talc, in accordance with Example 5 of the present disclosure.

The cup was filled to contain water and heated in a TURBOCHEF® Sota Model NGO combination microwave convection oven set to 525° F. at full microwave power and low convection airflow until the water reached a temperature of 180° F., i.e., about 30 seconds. In a separate trial, the microwave power was set to 60% and the water was heated for 1 minute. Under both of these conditions, the cup did not distort. Several trials were performed in which the cup was placed as near as 1 inch to the heating element of the oven and no distortion was observed. A photograph of the cup after testing is provided as FIG. 8.

Example 6: Injection Molded Bowl

This Example provides a thermally stable, injection molded bowl in accordance with the presently disclosed subject matter.

Figure 9:
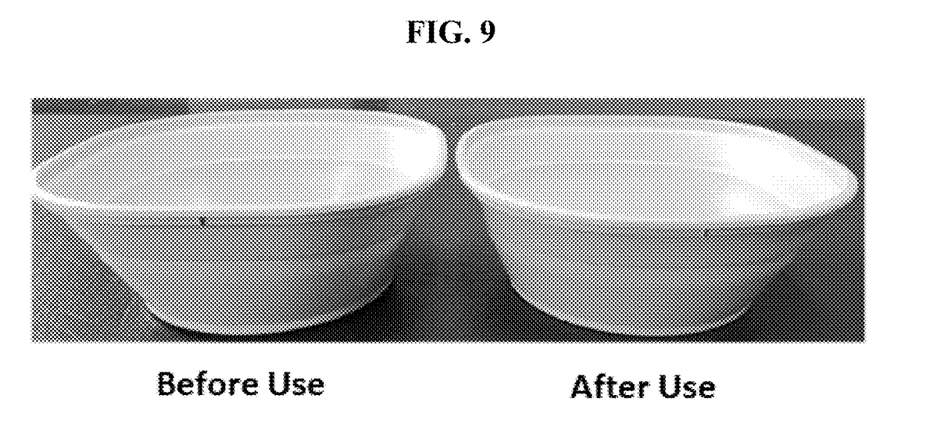
FIG. 9 is a photograph for side by side comparison of an injection molded bowl before and after being heated in an oven in accordance with Example 6 of the present disclosure.
Figure 10:
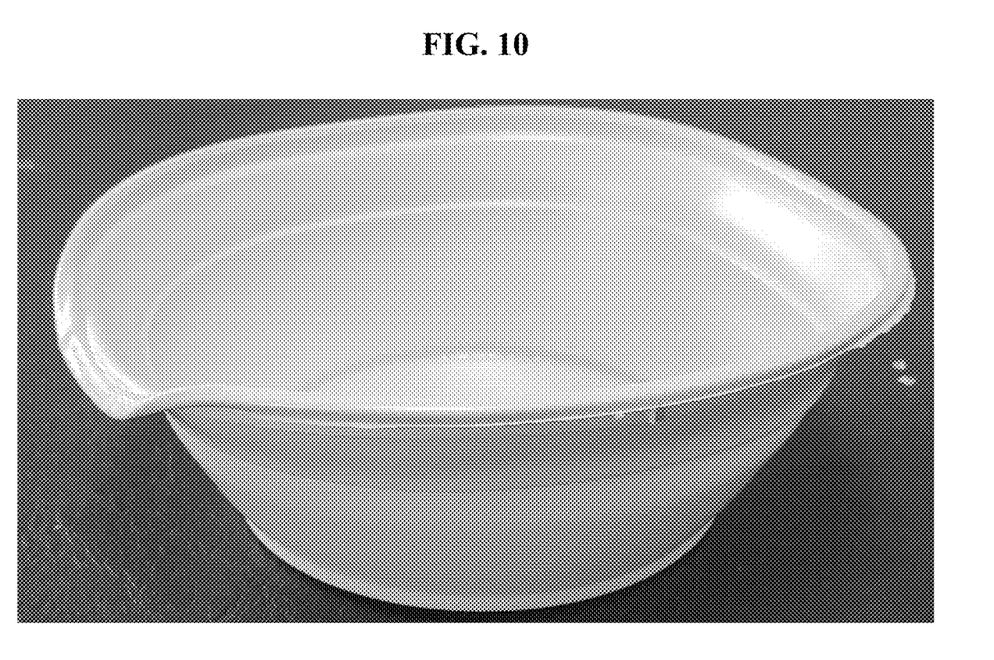
FIG. 10 is a photograph of an injection molded PET bowl comprising 15% mineral filler after being heated in an oven for purpose of comparison in accordance with Example 6 of the present disclosure.

An injection molded 18-ounce bowl with a mouth having cross dimensions in plan view of 5 inches×5 inches and a height of 2 inches, was formed from a polymer composition containing 65 wt-% PET C60A, 30 wt-% Talc T590, 3 wt-% Elvaloy® AC1224, and 2 wt-% White MB. The bowl was formed using a conventional injection molding process as described in the disclosed subject matter and the Husky Injection Mold System G160 RS42/35 with a single injection location at the center of the base of the bowl. The resulting bowl had a wall thickness of about 0.028 inches and less than about 5% crystallinity. The bowl was filled to contain about 12 ounces of water and placed in a TURBOCHEF® Sota Model NGO combination microwave convection oven preheated to 525° F. for 3 minutes. Additionally, the oven was set at full convection airflow and full microwave power for the duration of 3 minutes. This trial was repeated on three separate bowls, and no distortion was observed on any of the three bowls. In addition, the trial was repeated twice on the same bowl, and again no distortion was observed on the bowl. A photograph of the bowl before heating is provided on the left side and a photograph of the bowl after heating is provided on the right side of FIG. 9. For comparison, this trial was also conducted on an injection molded PET bowl of similar dimensions but comprising 82.5 wt-% PET C60A, 15 wt-% Talc T590, 1.5 wt-% Elvaloy® AC1224, and 1 wt-% White MB. As shown in FIG. 10, this PET bowl, which also contained about 12 ounces of water, exhibited visually perceptible deformations after 3 minutes in the same oven heated to 525° F. with the microwave at full power and full convection airflow for that duration.

Example 7: Injection Molded Bowl

This Example provides a thermally stable, injection molded bowl in accordance with the presently disclosed subject matter.

An injection molded 18-ounce bowl with a mouth having cross dimensions in plan view of 5 inches×5 inches and a height of 2 inches, was formed from a polymer composition containing 65 wt-% PET C60A, 30 wt-% Talc T590, 3 wt-% Elvaloy® AC1224, and 2 wt-% White MB. The bowl was formed using a conventional injection molding process as described in the disclosed subject matter and the Husky Injection Mold System G160 RS42/35 with a single injection location at the center of the base of the bowl. The resulting bowl had a wall thickness of about 0.028 inches and less than about 5% crystallinity. The bowl was filled to contain about 12 oz of water and placed in a TURBO-CHEF® Sota Model NGO combination microwave convection oven preheated to 525° F. for one minute, and left in the oven for an additional 5 minutes at 525° F. (i.e., a total exposure time of at least 6 minutes at 525° F.). Additionally, the convection air flow and microwave power of the TURBOCHEF® Sota Model NGO combination microwave convection oven was set to full during the initial one minute of this trial, and then turned off for the remaining 5 minutes. This trial was repeated on two separate bowls, and no distortion was observed on any of the two bowls.

While the disclosed subject matter is described herein in terms of certain preferred embodiments, those skilled in the art will recognize that various modifications and improvements can be made to the disclosed subject matter without departing from the scope thereof. Additional features known in the art likewise can be incorporated. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the various embodiments depicted and claimed, the disclosed subject matter is also directed to other embodiments having any other possible combination of the features disclosed and claimed herein. As such, the particular features presented herein can be combined with each other in other manners within the scope of the disclosed subject matter such that the disclosed subject matter includes any suitable combination of the features disclosed herein. Furthermore, although reference is made to a thermoformed lid throughout this disclosure, other suitable thermoformed articles likewise can be manufactured using the polymer compositions and methods disclosed herein. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the compositions and methods of the disclosed subject matter without departing from the spirit or scope of the disclosed subject matter. Thus, it is intended that the disclosed subject matter include modifications and variations that are within the scope of the appended claims and their equivalents.

What is claimed is:

1. A method of forming a polymeric article, comprising:
   providing a polymer composition comprising
   a crystallizable polymer in an amount from about 50 wt-% to about 85 wt-% based on a total weight of the polymer composition,
   a mineral filler in an amount from about 15 wt-% to about 50 wt-% based on the total weight of the polymer composition, and
   an impact modifier in an amount from about 0.5 wt-% to about 15 wt-% based on the total weight of the polymer composition,
   the crystallizable polymer having a crystallization temperature;
   heating the polymer composition to a molten state; and
   injection molding the polymer composition into a polymeric article without crystallization, wherein the injection molding includes:
   disposing the polymer composition in a mold at a mold temperature below the crystallization temperature of the crystallizable polymer,
   forming the polymer composition into the polymeric article within the mold with the mold temperature below the crystallization temperature of the crystallizable polymer; and
   releasing the polymeric article from the mold;
   wherein the polymeric article is a container thermally stable up to a temperature of at least about 450° F. for a duration of at least up to three minutes.

2. The method of claim 1, wherein the container comprises a container wall having a wall thickness of between about 0.025 inches and about 0.035 inches.

3. The method of claim 2, wherein the container is thermally stable up to a temperature of at least about 450° F. for a duration of at least three minutes when the container is at least partially filled with an aqueous liquid.

4. The method of claim 1, wherein the polymeric article is selected from a group consisting of a bowl, a platter, a cup, or a lid.

5. The method of claim 1, wherein the crystallizable polymer is selected from the group consisting of poly(ethylene terephthalate)(PET), poly(lactic acid) (PLA), poly(butyl terephthalate) (PBT), poly(ethylene naphthalate) (PEN), a copolymer of materials from the group thereof, and a blend of materials from the group thereof.

6. The method of claim 5, wherein the crystallizable polymer comprises non-nucleated poly(ethylene terephthalate) (PET).

7. The method of claim 1, wherein the polymer is about 55 wt-% to about 80 wt-% of the total weight of the polymer composition.

8. The method of claim 1, wherein the mineral filler is selected from the group consisting of talc, calcium carbonate, mica, silica, wollastonite, clay, calcium sulfate, alumina trihydrate, kaolin, feldspar, aluminum hydroxide, and a combination thereof.

9. The method of claim 8, wherein the mineral filler comprises talc.

10. The method of claim 1, wherein the mineral filler is about 15 wt-% to about 40 wt-% of the total weight of the polymer composition.

11. The method of claim 1, wherein the impact modifier is selected from the group consisting of a copolymer of ethylene and methyl acrylate, acrylonitrile butadiene styrene, acrylonitrile styrene acrylate, methacrylate-butadiene-styrene, ethylene propylene diene monomer, chlorinated polyethylene, a non-reactive modified polyolefin, crosslinked polyacrylate, and a combination thereof.

12. The method of claim 11, wherein the impact modifier comprises a copolymer of ethylene and methyl acrylate.

13. The method of claim 1, wherein the impact modifier is about 1 wt-% to about 12 wt-% of the total weight of the polymer composition.

14. The method of claim 1, wherein the polymer composition further comprises an additive selected from the group consisting of a pigment, a colorant, or a combination thereof.

15. The method of claim 14, wherein the polymer composition comprises:
   about 65 wt-% of the crystallizable polymer based on the total weight of the polymer composition;
   about 30 wt-% of the mineral filler based on the total weight of the polymer composition;
   about 3 wt-% of the impact modifier based on the total weight of the polymer composition; and
   about 2 wt-% of the additive based on the total weight of the polymer composition.

16. The method of claim 1, wherein the polymer composition comprises:
   from about 60 wt-% to about 75 wt-% of the crystallizable polymer based on the total weight of the polymer composition;
   from about 25 wt-% to about 30 wt-% of the mineral filler based on the total weight of the polymer composition; and
   from about 3 wt-% to about 10 wt-% of the impact modifier based on the total weight of the polymer composition.

17. The method of claim 16, wherein the container is thermally stable when the container at least partially contains an aqueous liquid and is placed in an environment at a temperature of about 525° F. for a duration of at least up to about 30 seconds.

18. The method of claim 17, wherein the container is thermally stable when the container at least partially contains an aqueous liquid and is placed in an environment at a temperature of about 525° F. for a duration of at least up to about 6 minutes.

19. The method of claim 17, wherein the container is thermally stable when the container at least partially contains an aqueous liquid and is in a convection oven at a temperature of about 525° F. for a duration of at least up to about 3 minutes with convection airflow.

* * * * *